United States Patent
Ingram et al.

[15] 3,690,738
[45] Sept. 12, 1972

[54] HYDRAULIC SYSTEMS FOR VEHICLES

[72] Inventors: Brian Ingram, Warks; Douglas Roy Spence, Warks; Robin Adam Cochrane, Warks, all of England

[73] Assignee: Girling Limited, Birmingham, England

[22] Filed: Dec. 8, 1970

[21] Appl. No.: 96,085

[52] U.S. Cl. ...................................... 303/21 F
[51] Int. Cl. ................................... B60t 8/06
[58] Field of Search ............................ 303/21 F

[56] References Cited

UNITED STATES PATENTS

| 3,532,391 | 10/1970 | Klein | 303/21 F |
| 3,610,702 | 10/1971 | MacDuff | 303/31 F |
| 3,521,934 | 7/1970 | Leiber | 303/21 F |
| 3,606,488 | 9/1971 | Beuchle et al. | 303/21 F |

Primary Examiner—Evon C. Blunk
Assistant Examiner—H. S. Lane
Attorney—Imirie and Smiley

[57] ABSTRACT

An anti-skid braking system includes hydraulically actuated valves which interrupt the supply of fluid to the brakes when deceleration is excessive, the pressure fluid for both the brakes and the actuators being supplied by a single pump driven by the vehicle starter motor, and means which control the pressure of the brake fluid and the actuator fluid to predetermined values.

8 Claims, 3 Drawing Figures

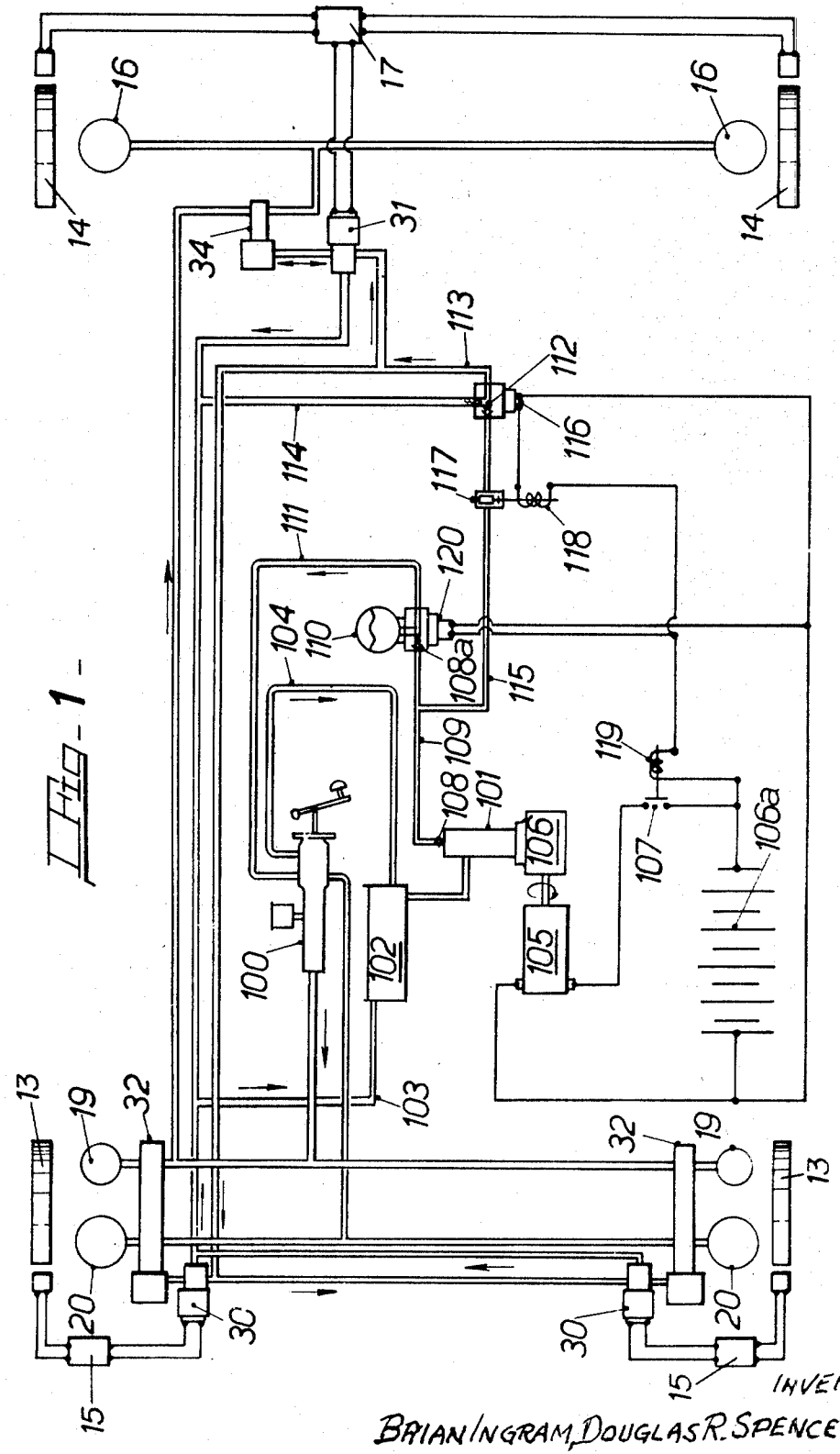

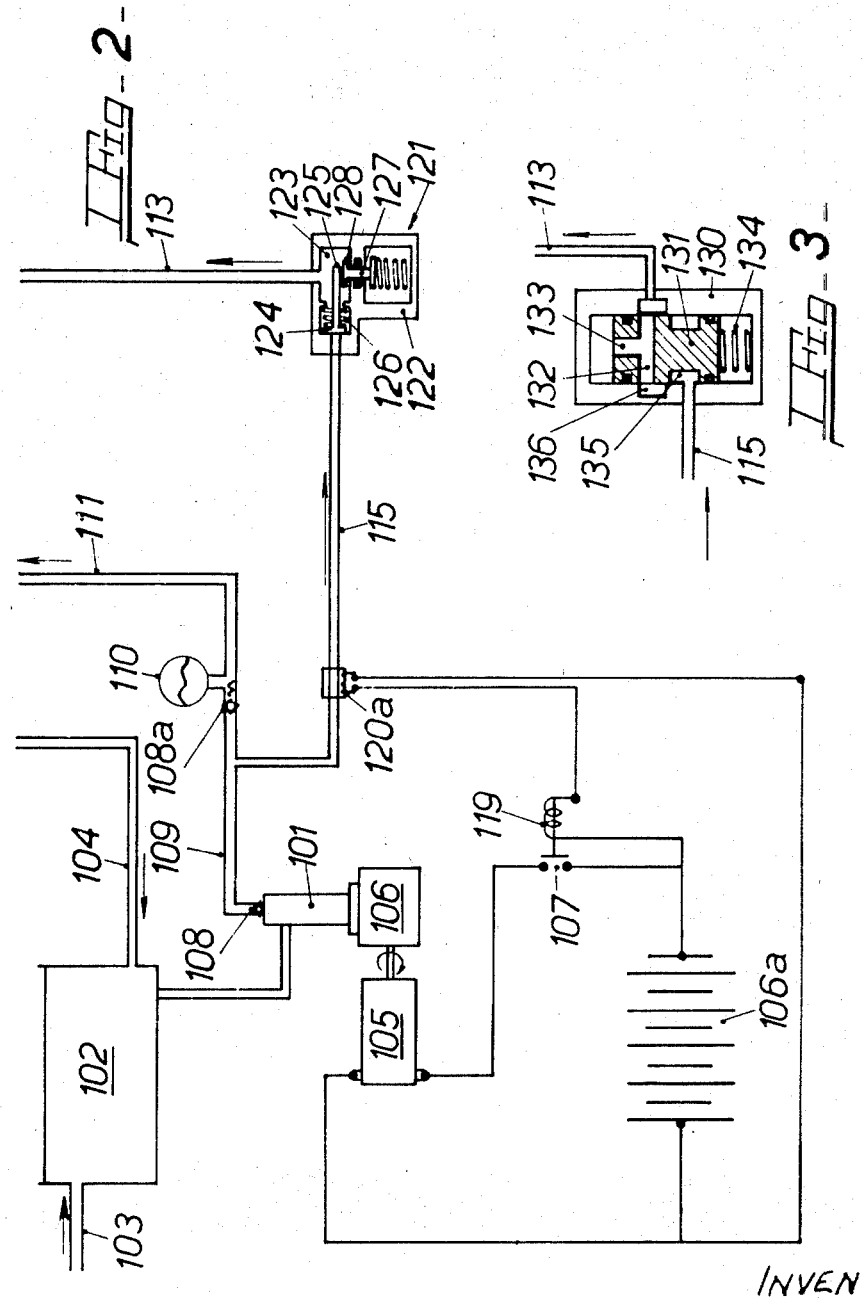

HYDRAULIC SYSTEMS FOR VEHICLES

BACKGROUND OF THE INVENTION

In a hydraulic system for a vehicle of the kind in which hydraulic fluid under pressure and under the control of a pedal-operated master valve is supplied to at least one slave cylinder of at least one wheel brake through a normally open hydraulically actuated valve, anti-skid sensing means are operative to control a supply of hydraulic fluid under pressure, hereinafter referred to as the control pressure, to the actuator to cause the actuator to close its associated valve and thereby cut off the supply of fluid to the slave cylinder when the deceleration to which the braked wheel is subjected exceeds a predetermined value.

Although the hydraulic fluid supplied by the master valve is at a pressure sufficient to apply an effective braking effort to the braked wheel, it is preferable that the pressure of hydraulic fluid supplied to the actuator via the anti-skid device is maintained at an intermediate value which, although sufficient to effect closure of the actuator, is at a pressure substantially less than that of the brake applying pressure.

In our U.S. application Ser. No. 73,081, the control pressure is supplied by a pump and the braking pressure is supplied by manual operation of the master cylinder. In order to increase the output pressure of the master cylinder it can also be supplied with high pressure fluid from a pump, as described in our U.S. application Ser. No. 77,708. Combining these two proposals to meet the preferred pressure requirements of an anti-skid system would lead to the use of separate pumps for the control pressure and the braking pressure. Since the pumps would be located in the engine compartment or bonnet space of the vehicle, the arrangement would be uneconomical in its use of materials and in its use of the limited space available in the engine compartment or bonnet space.

SUMMARY OF THE INVENTION

According to our invention, in an hydraulic system of the kind set forth for a vehicle, hydraulic fluid is supplied to both the master cylinder and the actuator from the output of a single driven pump, pressure responsive means being located in the output of the pump to cut off the supply to the actuator when a predetermined control pressure has been reached.

The pressure responsive means may also be arranged to stop the pump when a predetermined brake applying pressure has been reached which is higher than the said control pressure.

Preferably the pump is driven by an electric motor, such as the starter motor for the engine of the vehicle. The motor is of the type in which a greater torque is developed at a lower speed of rotation and a smaller torque is developed at a higher speed of rotation. Thus, when the motor is operating at a lower speed, the pump is adapted to supply a small volume of fluid at a higher pressure. When the motor is operating at a higher speed, the pump is adapted to supply a larger volume of fluid but at a lower pressure.

BRIEF DESCRIPTION OF DRAWINGS

FIG. 1 is a layout of a braking system for a vehicle incorporating a single pump to provide brake applying and control pressures;

FIG. 2 is a modification of a portion of the layout shown in FIG. 1; and

FIG. 3 is a modified valve for incorporation in the braking system illustrated in FIG. 2.

DETAILED DESCRIPTION OF THE INVENTION

In the braking system illustrated in FIG. 1, a pedal-controlled master valve 100 controls the supply of fluid under pressure from a pump 101 to the slave-cylinders 16, 19 and 20. The pump 101 also forms the source of control pressure fluid for the control valves 30 and 31 and the actuators 32 and 34.

The pump 101 delivers fluid along line 109 to an hydraulic accumulator 110 which is connected to the master valve 100 by line 111, the master valve 100 being connected to the pump reservoir 102 by return line 104. The pump 101 also delivers fluid along lines 115 and 113 to control valves 30 and 31 which are connected to the reservoir 102 by return line 103. The pump 101 is driven from an electric motor 105 through a cam box 106. The motor 105 is energized by an electrical storage battery 106a through a switch 107.

The supply line 115 to the control valves is connected into the supply line 109 to the accumulator 110 and non-return valves 108 and 108a are located in the line 109 upstream and downstream respectively of this connection.

In the supply line 115 there is located an isolating valve 117 and a combined relief and one-way valve 112 downstream of the isolating valve 117. The valve 112 is set to relieve to reservoir 102 via line 114 when the control pressure exceeds a predetermined value. The isolating valve 117 is controlled by a relay 118 which is connected in series with a relay 119 operating switch 107 in the motor circuit, battery 106a and a low pressure switch 116 sensitive to the pressure in the control circuit and located down stream of the relief and one-way valve 112.

A high pressure switch 120 sensitive to the pressure in the accumulator 110 is located downstream of one way valve 108a and is connected across the battery 106a and relay 119 and in parallel to relay 118 and low pressure switch 116.

Therefore, on switching on the vehicle ignition, pressure switches 116 and 120 both close and when either close, relay 119 is actuated to start motor 105 and pump 101. Also when switch 116 closes, relay 118 is actuated to open isolating valve 117 to allow fluid to be supplied to the control circuit. When the control pressure and the brake applying pressure have reached a predetermined value, for example 500 p.s.i. the low pressure switch 116 opens and de-energizes the relay 118 which allows the isolating valve 117 to close. The pump 101 continues to deliver fluid to the accumulator 110 until the brake applying pressure reaches a predetermined value, for example 2,500 p.s.i. when the high pressure switch opens and de-energizes the relay 119 to cut out the motor 105. Thereafter the motor 105 is energized and de-energized automatically if either the control pressure or the brake applying pressure drops below their predetermined values since the pressure switches 116 and 120 each form a circuit with the relay 119.

When the brakes are applied the deceleration of each front wheel is sensed by an electrically inductive sensor 13, and the deceleration of each rear wheel is sensed by an electrically inductive sensor 14.

When the deceleration of one of more wheels exceeds a predetermined value the A.C. output from the sensor on that wheel or wheels in question is fed to electronic control means which convert the A.C. signal into a D.C. output. Specifically, the output from each sensor 13 is fed to a separate electronic control module 15, and the A.C. signals from the sensors 14 are fed to a common electric control module 17.

Each control valve 30 is adapted to regulate the supply of fluid to an actuator 32 for controlling the braking effort applied to one of the front wheels of the vehicle in response to the D.C. output signal received from the control module 15 to which it is connected. The output signals from each control module 15 are responsive to the deceleration of the front wheel with which that module 15 is associated.

The control valve 31 is adapted to regulate the supply of fluid from the second circuit to an actuator 34 for controlling the braking effort applied to the rear wheels of the vehicle in response to the D.C. output signal received from the control module 17. The output signals from the control module 17 is responsive to the deceleration of the rear wheels of the vehicle.

In the modified layout illustrated in FIG. 2, the pressure switches 116 and 120, the isolating valve 117 and the combined relief and one way valve 112 are replaced by a single high pressure switch 120a located in the pump delivery line 115 and a pressure control valve assembly 121 in line 115 down stream of the switch 120a. The relief line 114 is omitted but the remainder of the layout is identical with that shown in FIG. 1 so that it need not be illustrated or described further herein.

In this modified construction, where corresponding reference numerals have been used to indicate corresponding parts, the pressure control valve assembly comprises a housing 122 provided with a chamber 123 connected between the line 115 and the line 113 to the control valves 30 and 31 and the actuators 32 and 34. A head 124 carried by a stem 125 of a tipping valve is adapted to be urged by a spring 126 into engagement with a seating in the housing to control fluid flow into the chamber 123 from the line 115. The head 124 normally is held in a tipped position with respect to the seating by the action of a spring loaded plunger 127 acting on the stem 125 through a head 128 of substantial diameter at its inner end which is located within the chamber 123.

When the pump 101 is operating, fluid under pressure is pumped to the hydraulic accumulator 110 and the chamber 123 through the line 109 and the line 115 until the pressure in the chamber 123 attains a predetermined value, for example 500 p.s.i. The pressure in the chamber 123 acts on the head 128 and, upon the said predetermined pressure being attained, the plunger 127 is moved against its spring loading to permit the head 124 of the tipping valve to close under the influence of the spring 126. Fluid is then pumped only to the hydraulic accumulator 110 until the pressure attains a predetermined value, for example 2,500 p.s.i., whereupon the pressure switch 120a opens to de-energize the relay 119 and switch off the electric motor 105.

The operation of this embodiment is otherwise the same as the embodiment of FIG. 1 and need not be described further herein.

The pressure control valve 121 illustrated in FIG. 2 may be replaced by a valve of the construction illustrated in FIG. 3. The valve illustrated in FIG. 3 comprises a cylindrical housing 130 which is closed at opposite ends and in which works a valve spool 131. The valve spool 131 is provided at an intermediate point in its axial length with a diametrical passage 132 leading through an axial passage 133 into the upper end of the housing 130 towards which the valve spool 131 is urged by a compression spring 134 acting between the opposite lower end of the valve spool 131 and the housing 130. The valve spool 131 is provided at an intermediate point in its length between the passage 132 and its lower end with an annular recess 135 which is normally aligned, at least partially, with an annular recess 136 in the wall of the housing 130 leading to the line 113. When the valve spool 131 is in its normal open position the line 115 leads into the annular recess 135 so that the line 115 delivers fluid to the line 113 through the recesses 135 and 136. Fluid pressure in the diametrical passage 132 is relieved to the upper end of the housing 130 so that this pressure acts downwardly over the full area of spool 131. When the pressure attains a predetermined value, for example 500 p.s.i. the valve spool 131 moves downwardly against the loading of the spring 134, into the position shown, to cut off communication between the recesses 135 and 136.

The construction and operation of the embodiment is otherwise the same as that of the embodiment of FIG. 2 and need not be described further herein.

The electric motor 105 conveniently is the starter motor for the engine of the vehicle. A characteristic of such a motor is that greatest torque is developed at low speed so that at low speed the pump driven by the motor is adapted to supply a small volume of fluid at high pressure. Whereas at a higher speed of rotation of the motor, the pump is adapted to supply a larger volume of fluid at a lower pressure. Since the hydraulic system described requires relatively large fluid volumes at, say, 500 p.s.i. for the control circuit and relatively smaller volumes of fluid at, say, 2,500 p.s.i., for the braking circuit, an electric starter motor is able to fulfill both these requirements.

The pump could be driven by its own electric motor or directly from the engine of the vehicle, through it is preferable for the motor to be independent of the engine which may stall or be idling during a skid.

What we claim is:

1. A vehicle brake hydraulic system comprising a single driven pump, a pedal operated master valve for controlling a high pressure supply of fluid from the pump to at least one slave cylinder of at least one wheel brake, a normally open valve having a fluid actuator through which valve passes the fluid supply to the at least one slave cylinder, anti-skid sensing means for controlling a by-pass supply of fluid from the pump to the actuator to cause its valve to close and thereby cut off the supply of fluid to the at least one slave cylinder when the deceleration to which the braked wheel is subjected exceeds a predetermined value, the fluid supply passed by said actuated valve being at a lower control pressure, and pressure responsive means located in the output of the pump to cut off the fluid supply for the actuated valve when a predetermined control pressure has been reached.

2. A system as in claim 1 wherein the pressure responsive means are operative to stop the pump when a predetermined brake applying pressure has been reached which is higher than the said control pressure.

3. A system as in claim 2, wherein the pump is driven by the starter motor of the vehicle.

4. A system as in claim 2 wherein a pressure switch is located in the pump output to make and break an electrical circuit controlling the operation of the pump in response to variations in the brake applying pressure about the predetermined value.

5. A system as in claim 4, wherein a second pressure switch is located in the fluid supply to the fluid actuated valve to make and break an electrical circuit controlling the operation of a valve adapted to isolate the actuated valve from the pump, said second pressure switch being responsive to variations in the control pressure above the predetermined value.

6. A system as in claim 4, wherein a control valve is located in the fluid supply to the actuator to isolate or connect the actuator to the pump in response to variations in the control pressure above the predetermined value.

7. A system as in claim 6, wherein the control valve is a pressure responsive tipping valve.

8. A system as in claim 6, wherein the control valve is a pressure responsive spool valve.

* * * * *